(12) United States Patent
Kato et al.

(10) Patent No.: US 7,980,618 B2
(45) Date of Patent: Jul. 19, 2011

(54) HOUSING SYSTEM AND HOUSING METHOD FOR PASSENGER SEAT

(75) Inventors: Hideyuki Kato, Toyota (JP); Hideyuki Murasato, Novi, MI (US)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 91 days.

(21) Appl. No.: 12/523,907

(22) PCT Filed: Jan. 28, 2008

(86) PCT No.: PCT/IB2008/000179
§ 371 (c)(1),
(2), (4) Date: Jul. 21, 2009

(87) PCT Pub. No.: WO2008/093197
PCT Pub. Date: Aug. 7, 2008

(65) Prior Publication Data
US 2010/0102585 A1   Apr. 29, 2010

(30) Foreign Application Priority Data
Jan. 31, 2007   (JP) .................................. 2007-021884

(51) Int. Cl.
*B60N 2/30*   (2006.01)
(52) U.S. Cl. .................... 296/65.09; 296/64; 296/65.03; 296/65.16; 296/24.34; 296/37.8
(58) Field of Classification Search ............... 296/24.34, 296/37.8, 37.13–37.16, 64, 65.03, 65.05, 296/65.09, 65.16, 69; 297/14, 15, 232, 234, 297/248, 249
See application file for complete search history.

(56) References Cited

U.S. PATENT DOCUMENTS

| | | | | |
|---|---|---|---|---|
| 1,268,800 A * | 6/1918 | Adelsperger et al. | ......... | 297/238 |
| 1,323,693 A * | 12/1919 | Henderson | ............... | 296/65.09 |
| 4,527,828 A * | 7/1985 | Groce et al. | ............. | 296/65.09 |
| 5,492,386 A * | 2/1996 | Callum | ......................... | 296/64 |
| 5,984,397 A * | 11/1999 | Dawson et al. | ............ | 296/65.09 |
| 6,246,261 B1 * | 6/2001 | Monceau | ........................ | 326/46 |
| 6,629,729 B2 * | 10/2003 | Wiedeman et al. | ........... | 297/232 |
| 6,648,392 B2 * | 11/2003 | Fourrey et al. | ............. | 296/65.09 |
| 6,702,363 B2 * | 3/2004 | Tohda et al. | ................ | 296/124 |
| 6,811,200 B2 * | 11/2004 | Shibata et al. | ................. | 296/64 |
| 6,955,386 B2 * | 10/2005 | Rhodes et al. | ............ | 296/65.09 |
| 7,341,302 B2 * | 3/2008 | Slade | ........................ | 296/65.01 |
| 7,484,786 B2 * | 2/2009 | Muck et al. | ............... | 296/65.09 |
| 7,520,566 B2 * | 4/2009 | Braun | ......................... | 297/335 |
| 7,537,260 B2 * | 5/2009 | Epaud | ........................ | 296/65.09 |
| 2002/0024228 A1* | 2/2002 | Glaser | ........................ | 296/65.03 |

(Continued)

FOREIGN PATENT DOCUMENTS

DE   101 55 218   10/2002

(Continued)

*Primary Examiner* — Glenn Dayoan
*Assistant Examiner* — Gregory Blankenship
(74) *Attorney, Agent, or Firm* — Oblon, Spivak, McClelland, Maier & Neustadt, L.L.P.

(57) ABSTRACT

A center seat provided rightward in a left seat is detached from a center seat retention base when a seatback is caused to fold so that the thickness direction of the seatback coincides with the thickness direction of a seating cushion. Then, the folded center seat is caused to move on a floor forward in the vehicle, and is housed into a center seat-housing portion in a console box.

18 Claims, 9 Drawing Sheets

U.S. PATENT DOCUMENTS

| | | |
|---|---|---|
| 2003/0107233 A1 | 6/2003 | Behrends et al. |
| 2004/0100114 A1 | 5/2004 | Rhodes et al. |
| 2005/0052044 A1* | 3/2005 | Toyota et al. ............... 296/24.34 |
| 2007/0013204 A1* | 1/2007 | Yajima et al. ............... 296/65.03 |
| 2009/0243325 A1* | 10/2009 | Villeminey ................ 296/65.09 |
| 2009/0302632 A1* | 12/2009 | Kuno et al. ................. 296/65.09 |
| 2010/0032976 A1* | 2/2010 | Yamashita et al. ............ 296/24.3 |
| 2010/0102585 A1* | 4/2010 | Kato et al. .................. 296/24.34 |
| 2010/0289290 A1* | 11/2010 | Parkinson et al. ......... 296/65.03 |

FOREIGN PATENT DOCUMENTS

| | | |
|---|---|---|
| FR | 2 811 620 | 1/2002 |
| JP | 6 53274 | 7/1994 |
| JP | 2001 347890 | 12/2001 |
| JP | 2003 246232 | 9/2003 |
| JP | 2004 243876 | 9/2004 |
| JP | 2004 262424 | 9/2004 |

* cited by examiner

HOUSING SYSTEM AND HOUSING METHOD FOR PASSENGER SEAT

BACKGROUND OF THE INVENTION

1. Field of the Invention

The invention relates to a housing system and a housing method for a passenger seat provided in a vehicle cabin.

2. Description of the Related Art

In Japanese Patent Application Publication No. 2004-262424 (hereinafter, referred to as "JP-A-2004-262424"), a base of the center seat in the second row is described to be detachable from a floor portion of the vehicle body (i.e., a vehicle body floor). To house the center seat, the base of the center seat is detached from the floor portion. Then, the seating cushion of the center seat is detached from the base of the center seat, and the seatback is folded to a surface (i.e., upper surface) of the base of the center seat. Then, each of the seating cushion and the base of the center seat with the seatback folded over is housed within a recess portion formed under the vehicle body floor. The recess portion is located in front of the back-row seats.

In Japanese Patent Application Publication No. 2004-243876 (hereinafter, "JP-A-2004-243876"), the base of the center seat in the second row is also described to be detachable from the floor portion of the vehicle body, which is similar to JP-A-2004-262424. However, the seating cushion of the center seat described in JP-A-2004-243876, is not detached from the base of the center seat. Alternatively, the seatback is folded over to a surface (i.e., upper surface) of the seating cushion instead of the base of the center seat. Then, the base of the center seat is housed within a recess portion formed under the vehicle body floor. The recess portion in JP-A-2004-243876 is also located in front of the back-row seats.

In both JP-A-2004-262424 and JP-A-2004-243876, the center seat detached from the floor portion is folded over, and then is housed within the recess portion formed recess portion formed under the vehicle body floor. Therefore, when the center seat is to be housed within the recess portion, it is necessary to house the center seat within the recess portion while the folded center seat is being supported over the recess portion. Besides, when the center seat is to be taken out from the recess portion, it is necessary to lift up the center seat from the recess portion.

Thus, the operations of housing the center seat into the recess portion and taking the center seat out of the recess portion is not easy to perform because an operator is required to carry the weight of the center seat. In particular, according to JP-A-2004-262424, when the center seat in the second row is to be housed, the seating cushion needs to be detached from the base of the center seat while the seating cushion needs to be fitted to the base of the center seat when the center seat is to be provided again at the back-row seats. Therefore, those operations may be further cumbersome.

SUMMARY OF THE INVENTION

The invention provides a housing system and a housing method for a passenger seat that facilitate the housing and the taking out of the seat as well as housing the seat.

A housing system for a passenger seat according to the first aspect of the invention includes: a seat body that includes a seating cushion and a seatback, the seatback being capable of being folded with respect to the seating cushion so that a thickness direction of the seatback coincides with the thickness direction of the seating cushion; and a housing portion into which the seat body is capable of being housed with the seatback being folded, the housing portion being provided facing the seat body in a horizontal direction.

In the housing system for the passenger seat according to the first aspect, the seatback of the seat body is folded with respect to the seating cushion of the seat body so that the thickness direction of the seatback coincides with the thickness direction of the seating cushion. From this state, one of the seat body and the housing portion provided facing the seat body in the horizontal direction is horizontally moved closer with respect to the other, and thereby the seat body is housed into the inside of the housing portion. On the other hand, when the seat body in the folded state has been housed into the housing portion, one of the seat body and the housing portion is moved apart from the other, and thereby the seat body is taken out of the housing portion.

Thus, in the housing system for the passenger seat according to the first aspect of the invention, when the seat body is to be housed into the housing portion, or when the seat body is to be taken out of the housing portion, it is not necessary to support the seat body or the housing portion in an up-down direction, but it suffices merely to cause to move the seat body or the housing portion horizontally. Therefore, the operations of housing and taking out the seat body may become simple.

A housing system for the passenger seat according to the second aspect of the invention includes: a seat body that includes a seating cushion and a seatback, the seatback being capable of being folded with respect to the seating cushion so that a thickness direction of the seatback coincides with the thickness direction of the seating cushion; and a housing portion into which the seat body is capable of being housed with the seatback being folded, the housing portion being provided on a floor of the vehicle cabin.

In the housing system for the passenger seat according to the second aspect, the seatback of the seat body is folded with respect to the seating cushion of the seat body so that the thickness direction of the seatback coincides with the thickness direction of the seating cushion. From this state, one of the seat body and the housing portion provided on the floor portion of the vehicle is horizontally moved closer with respect to the other, and thereby the seat body is housed into the housing portion. On the other hand, when the seat body in the folded state has been housed into the housing portion, one of the seat body and the housing portion is moved apart from the other, and thereby the seat body is taken out of the housing portion.

Thus, in the housing system for the passenger seat according to the second aspect of the invention, when the seat body is to be housed into the housing portion, or when the seat body is to be taken out of the housing portion, it is not necessary to support the seat body or the housing portion in an up-down direction, but it suffices merely to move the seat body or the housing portion on the floor portion because the housing portion is provided on the floor portion of the vehicle. Therefore, the operation of housing and taking out the seat body becomes easier.

The housing system may further include a main seat that is provided lateral to the seat body; and linking means for detachably linking the seat body with the main seat, the linking means being provided in the main seat.

The seat body may have a linked portion that is linked with the linking means of the main seat, and is capable of burying in the seat body.

The main seat may have seat retention means for retaining the seat body so that the seat body is apart upward from the floor of the vehicle cabin.

The seat body may be a center seat of a back-row seat disposed in the vehicle cabin, and the seat retention means may include a center seat retention base that retains the center seat apart upward from the floor of the vehicle cabin.

The center seat retention base may include a retention frame and a retention plate that is fixed to the retention frame.

The retention frame may include a linking rod that is linked with a leg portion provided in the main seat, and a linking bracket that is linked with a sliding member provided in the main seat.

The housing portion may have a box shape which is opened toward the facing seat body along the floor of the vehicle cabin.

The housing portion may have a lid that is capable of opening or closing the housing portion.

A housing method of the passenger seat according to the third aspect of the invention includes: folding a seatback provided in a seat body with respect to a seating cushion provided in the seat body so that a thickness direction of the seatback coincides with the thickness direction of the seating cushion; and housing the seat body with the seatback being folded into a housing portion that is provided facing the seat body in a horizontal direction.

A housing method of the passenger seat according to the fourth aspect of the invention includes: folding a seatback provided in a seat body with respect to a seating cushion provided in the seat body so that a thickness direction of the seatback coincides with the thickness direction of the seating cushion; and housing the seat body with the seatback being folded into a housing portion that is provided on a floor of the vehicle cabin.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments according to the housing system and the housing method for the passenger seat of the invention will be described with reference to the drawings.

Figure 1:
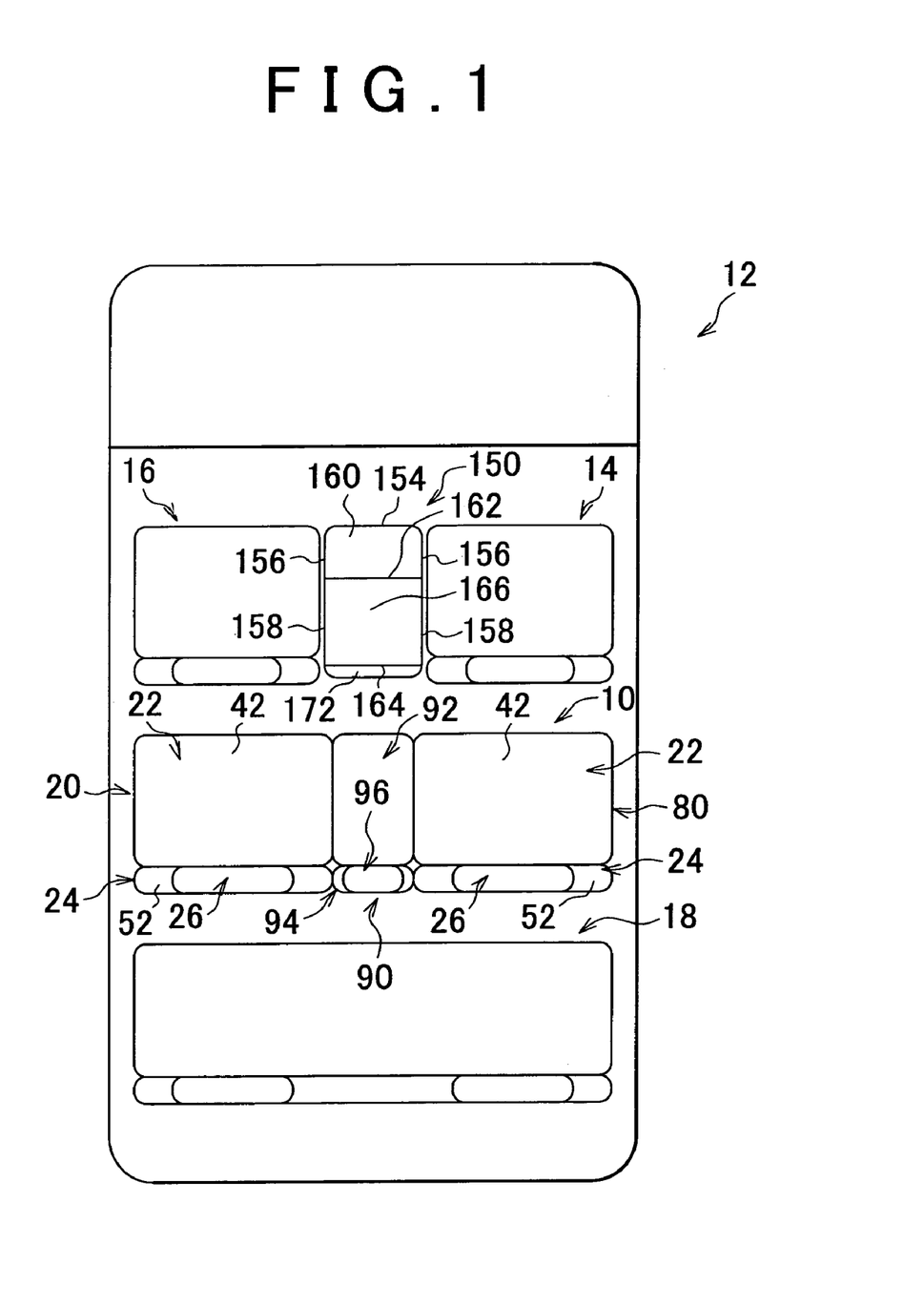
FIG. 1 is a schematic interior plan view showing a vehicle cabin that incorporates passenger seats in accordance with an embodiment of the invention.

FIG. 1 is a schematic interior plan view showing a vehicle cabin that incorporates passenger seats 10 in accordance with an embodiment of the invention.

As shown in FIG. 1, a driver seat 14 is provided in the first row of the passenger seats 10. The following description will be made under the assumption that the driver seat 14 is disposed on the right side when viewed from rear with respect to the width direction of the vehicle 12. A navigator seat 16 forming the first-row seats of the vehicle 12 with the driver seat 14 is provided on the left side of the driver seat 14. In the embodiment, the navigator seat 16 is disposed on the left side with respect to the width direction of the vehicle 12, and is also disposed apart from the driver seat 14.

Passenger seats 10 in the second row are provided behind the first-row seats composed of the driver seat 14 and the navigator seat 16. Furthermore, a rearmost seat 18 is provided in the third row behind the passenger seats 10.

Figure 2:
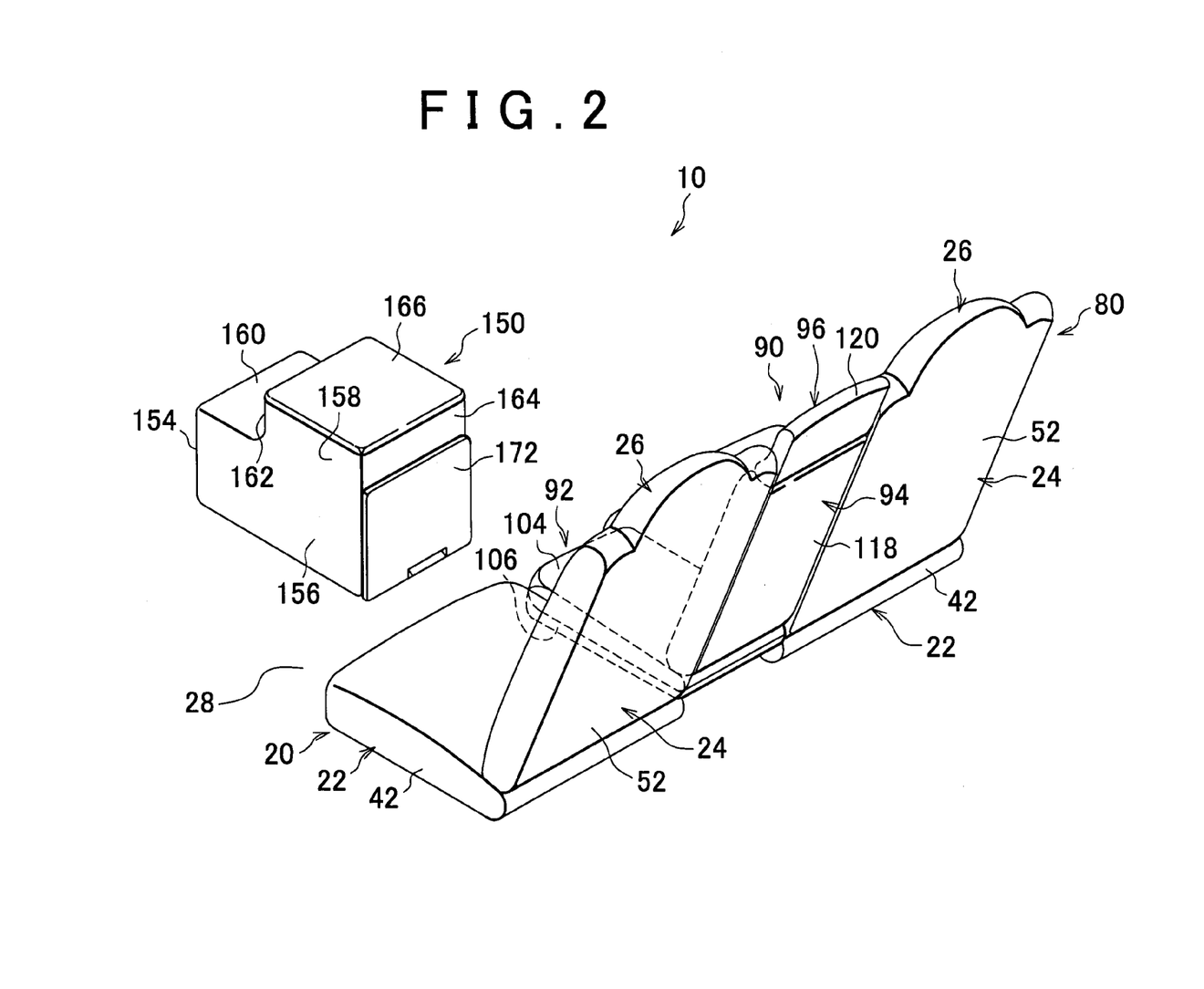
FIG. 2 is a perspective rear view of passenger seats in accordance with the embodiment of the invention.

FIG. 2 is a perspective view of passenger seats 10. Incidentally, in all drawings other than FIG. 1, the vehicle 12, the driver seat 14 and the rearmost seat 18 are omitted.

Figure 7:
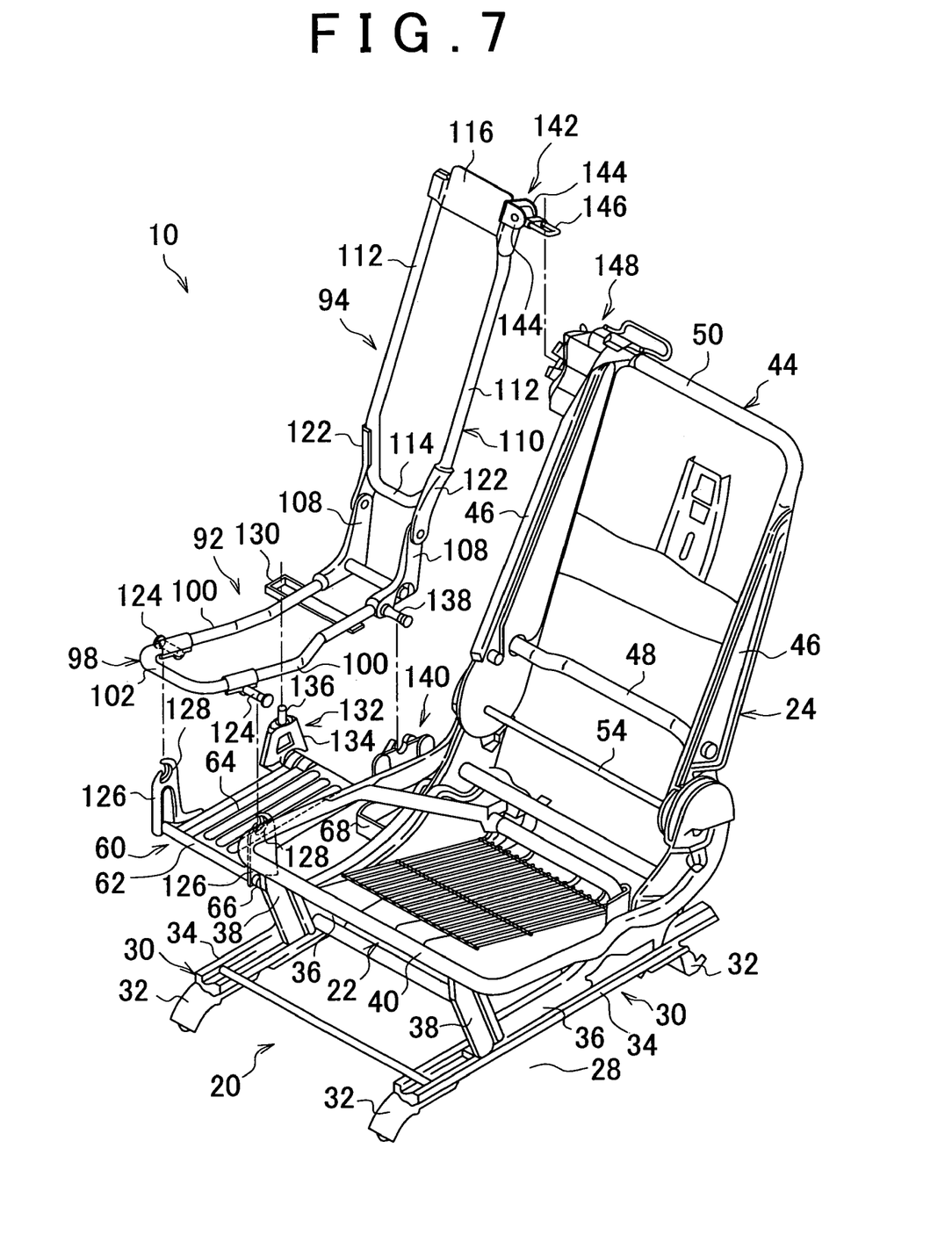
FIG. 7 is an exploded perspective view showing internal structures of a center seat and a side seat forming passenger seats in accordance with an embodiment of the invention.

The passenger seats 10 include a left-side seat 20 as a main seat provided on the left side with respect to the width direction of the vehicle 12. The left-side seat 20 includes a seating cushion 22 whose upper surface forms a seating surface, a seatback 24 that forms a backrest, and a headrest 26 that corresponds to rear of the passenger's head. As shown in FIG. 7, a pair of guide rails 30 is provided in a position corresponding to the seating cushion 22 on a floor 28, that is, a floor portion of the vehicle 12. Each of the guide rails 30 has a pair of leg portions 32 that are arranged in the longitudinal direction of the vehicle 12. The leg portions 32 are fixed on the floor 28.

Also, each of the guide rails 30 has a rail body 34 that extends in the longitudinal direction of the vehicle 12. A front end of the rail body 34 is fixed to a front leg of the pair of the leg portions 32 while a rear end of the rail body 34 is fixed to a rear leg of the pair of the leg portions 32. Each of the sliders 36 forming the seating cushion 22 is respectively provided on each of the rail body 34. The sliders 36 are guided in the longitudinal direction of the vehicle 12 by each of the rail body 34, and may also be locked in such a manner that the sliders 36 is restricted from sliding in the longitudinal direction by lock means (not shown).

A lower end of each leg piece 38 is fixed on each of the sliders 36. On the other hand, an upper end of each leg piece 38 is fixed to a seating cushion frame 40. The seating cushion frame 40 has a body portion formed by bending a steel tube or a stainless steel pipe into the figure of "C", which is opened backward the vehicle 12 in a plan view. Both ends of the body portion of the seating cushion frame 40, which are opening toward the rear side of the vehicle 12, are interlinked with a connecting portion formed of a bended pipe member, a bended plate-like member or the like, and thereby both ends of the body portion are closed. Therefore, the overall rigidity of the seating cushion frame 40 is secured or improved. Also, a pad portion (not shown) formed of a polyurethane resin or the like is provided in such a manner that the seating cushion frame 40 may be entirely covered. Furthermore, a shell portion 42, as shown in FIG. 2, formed of a fabric, leather, synthetic leather, etc. wraps the pad portion.

On the other hand, the seatback 24 has a seatback frame 44 as shown in FIG. 7. The seatback frame 44 has a pair of side frames 46. Each of the side frames 46 is formed into a plate-like shape whose thickness direction coincides with the width direction of the left-side seat 20, and the side frames 46 are disposed facing each other in the width direction of the left-side seat 20. A longitudinal lower frame 48 is provided around lower ends of the side frames 46. The intermediate portion of the longitudinal lower frame 48 is formed by appropriately bending a pipe member such as a steel tube or a stainless steel pipe.

One end of the longitudinal lower frame 48 is fixed to one of the side frames 46, and the other end of the longitudinal lower frame 48 is fixed to the other of the side frames 46. As a result, the lower ends of the side frames 46 are linked with the longitudinal lower frame 48. On the other hand, an upper pipe 50 is provided around upper ends of the side frames 46. The upper pipe 50 is formed by curving a pipe member whose shape at cross section into the figure of "C" or "U", which is opened downward the left-side seat 20.

One end of the upper pipe 50 connects to one upper end of the side frames 46, and the other end of the upper pipe 50 connects to the other upper end of the side frame 46. Thus, all upper ends of the side frames 46 are linked with the upper pipe 50. Also, the pad portion (not shown) formed of a polyurethane resin or the like is provided in such a manner that the seatback frame 44 may be entirely covered or wrapped in the pad portion. Furthermore, a shell portion 52, as shown in FIG. 2, formed of a fabric, leather, synthetic leather, etc. wraps the pad portion. The pad portion covering the seatback frame 44 also covers the headrest 26 disposed above the upper pipe 50. The shell portion 52 also wraps the pad portion covering the headrest 26.

As shown in FIG. 7, a connecting shaft 54 is provided near rear ends of the sliders 36 to connect the left and right sliders 36. Also, lower ends of the side frames 46 of the seatback frame 44 are linked with the connecting shaft 54. As a result, the seatback frame 44 may pivot with respect to the connecting shaft 54 as a pivot shaft. Furthermore, a reclining mechanism (not shown) is provided near one of the rear ends of the left and right sliders 36, and is linked with the connecting shaft 54. In a locked state established by the reclining mechanism, the seatback frame 44 is restricted from pivoting with respect to the connecting shaft 54. When the locked state by the reclining mechanism is released, the seatback frame 44 may be pivoted with respect to the connecting shaft 54.

Furthermore, on the center side of the vehicle 12 in the width direction, the leg piece 38 or the slider 36 is provided with a center seat retention base 60. The center seat retention base 60 may be regarded as "seat retention means" of the invention. The center seat retention base 60 includes a retention frame 62. The retention frame 62 is formed into a rectangular shape into in a plan view with a pipe member such as a steel tube, a stainless steel pipe. An intermediate portion of the retention frame 62 in the width direction is provided with a retention plate 64 connecting a front end and a rear end of the retention frame 62. A front end of the retention plate 64 is fixed to the front end of the retention frame 62 while a rear end of the retention plate 64 is fixed to the rear end of the retention frame 62.

The retention frame 62 of the center seat retention base 60 is provided with a linking rod 66 and a linking bracket 68. When seen from behind the vehicle 12, the linking rod 66 is provided on a left end of the front retention frame 62, and is linked with an upper end of the leg piece 38 disposed in the right side. On the other hand, the link bracket 68 is provided on a left end of the rear retention frame 62, and is linked with the rear end of the slider 36 disposed in the right side. Therefore, the center seat retention base 60 is supported on the left-side seat 20 through the link rod 66 and the link bracket 68, and thereby is spaced from the floor 28 of the vehicle 12.

On the other hand, as shown in FIG. 1, the passenger seats 10 also include a right-side seat 80 with respect to the width direction of the vehicle 12. The right-side seat 80 has basically the similar construction to the left-side seat 20. However, the link rod 66 and the link bracket 68 are not provided with the right-side seat 80, and thereby the right-side seat 80 does not support the center seat retention base 60. Although the left-side seat 20 is provided with the center seat retention base 60 in the embodiment, the right-side seat 80 may be alternatively provided with the center seat retention base 60.

As shown in FIG. 1, a center seat 90 is provided between the left-side seat 20 and the right-side seat 80. The center seat 90 may be regarded as "seat body" in the invention. As shown in FIG. 2, the center seat 90 includes a seating cushion 92 whose upper surface forms a seat surface, a seatback 94 that forms a backrest, and a headrest 96 that corresponds to rear of the passenger's head sitting in the center seat 90. As shown in FIG. 7, the seating cushion 92 includes a seating cushion frame 98 that is formed by bending a steel tube, a stainless steel pipe or the like as an overall construction.

The seating cushion frame 98 includes a pair of first side pipes 100 along the longitudinal direction of the vehicle 12, and a front pipe 102 that interconnects front ends of the first side pipes 100. The seating cushion frame 98 as a whole is formed into the figure of "C", which is opened backward the vehicle 12 in a plan view. The seating cushion frame 98 is provided with a pad portion (not shown) formed of a polyurethane resin or the like so as to cover the entire seating cushion frame 98. Furthermore, as shown in FIG. 2, at least an upper side of the pad portion in the thickness direction is covered with a shell portion 104 that is formed of a fabric, leather, synthetic leather, etc. while a lower side of the pad portion in the thickness direction is covered with a cushion base 106 that is formed of a hard synthetic resin.

As shown in FIG. 7, a bracket 108 is fitted to a rear end of each of the first side pipes 100. The brackets 108 are bent into the figure of "L" in a side view. One end of the bracket 108 is linked with the first side pipe 100, and the other end of the bracket 108 extends upward from the bent portion of the bracket 108. A seatback frame 110 of a seatback 94 is provided above the brackets 108. The seatback frame 110 is formed by bending a steel tube or a stainless steel pipe. The seatback frame 110 has a pair of second side pipes 112 generally along an up-down direction of the vehicle 12 as shown in FIG. 7.

One end of each of the second side pipe 112 is linked with a lower pipe 114. The seatback frame 110 is formed into the figure of "C", which is opened in the opposite direction from the lower pipe 114. The other end of each of the second side pipe 112 is linked with an upper frame 116. The seating cushion frame 98 as described above is covered with a pad portion (not shown) formed of a polyurethane resin or the like. Furthermore, the pad portion is wrapped in a shell portion 118 (see FIG. 2) formed of a fabric, leather, etc.

A headrest bracket (not shown) is linked with the upper frame 116, and may pivot with respect to the seatback frame 110 around an axis provided along the width direction of the seatback 94 (i.e., the width direction of the vehicle 12). Besides, the headrest bracket or the seatback frame 110 is provided with a lock mechanism (not shown). The lock mechanism, when in a locked state, restricts the pivoting of the headrest bracket with respect to the seatback frame 110, and therefore retains the headrest bracket.

When the locked state of the headrest bracket by the lock mechanism is released, the headrest bracket may pivot with respect to the seatback frame 110. The headrest bracket is covered with a pad portion (not shown) formed of a polyurethane resin or the like. Furthermore, the pad portion is covered with a shell portion 120 (see FIG. 2) formed of a fabric, leather, etc.

As shown in FIG. 7, one end of each of link pieces 122 is fixed to the lower pipe 114 that connects the second side pipes 112 of the seatback frame 110. On the other hand, the other end of each of the link pieces 122 extends further downwards along the longitudinal direction of the second side pipes 112, as compared to the lower pipe 114. Also, the other end of the link piece 122 that is fixed to the left one of the second side pipes 112 is linked with the other end of the left bracket 108, and may pivot with respect to an axis provided along the width direction of the seatback 94 (i.e., the width direction of the vehicle 12). Likewise, the other end of the link piece 122 that is fixed to the right one of the second side pipes 112 is linked with the other end of the right bracket 108, and may pivot with respect to an axis provided along the width direction of the seatback 94 (i.e., the width direction of the vehicle 12).

Figure 5:
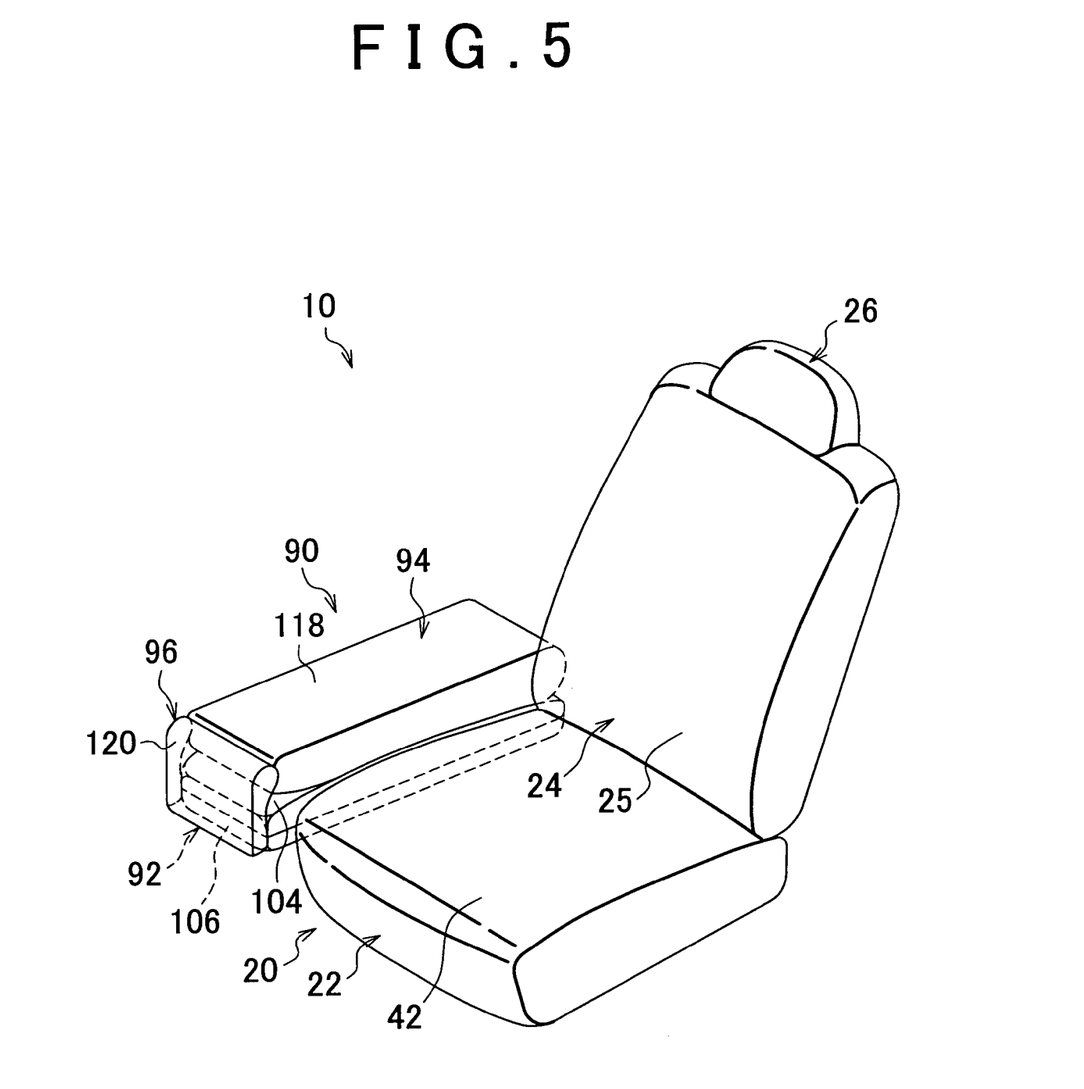
FIG. 5 is a perspective front view of the passenger seat in accordance with the embodiment of the invention, showing a folded seatback of the seat body.

As a result, the seatback frame 110 may pivot with respect to the seating cushion frame 98 around an axis provided along the width direction of the seatback 94, so that the seatback 94 may pivot from a "normal use state", as shown in FIG. 2, under which the thickness direction of the seatback 94 faces forward of the vehicle 12 to a "folded state", as shown in FIG. 5, under which the thickness direction of the seatback 94 substantially coincides with the thickness direction of the seating cushion frame 98. Furthermore, at least one of the brackets 108 and the link pieces 122 is provided with urging means, which urges the second side pipes 112 with respect to the brackets 108 in a pivoting direction of the seatback frame 110 from the normal use state to the folded state of the seatback 94.

As shown in FIG. 7, first restriction pins 124 are provided in the vicinity of the front ends the first side pipes 100 forming the seating cushion frame 98. The first restriction pins 124 is respectively fixed to the first side pipes 100 in such a manner that each of the first restriction pins 124 is protruded from the first side pipe 100 outward the width direction of the seating cushion frame 98 (i.e., the seating cushion 92). Specifically, even in a state where the seating cushion frame 98 is covered with the pad portion, the shell portion 104 or a cushion base 106, a distal end of each of the first restriction pins 124 is protruded from the shell portion 104 or the cushion base 106 outward the width direction of the seating cushion 92.

Corresponding to the first restriction pins 124, restriction plates 126 are provided on the center seat retention base 60. The thickness direction of the restriction plates 126 substantially coincides with the width direction of the center seat 90. Each of the restriction plates 126 has a cutout portion 128. The cutout portion 128 is opened toward a front edge of each of the restriction plates 126 in the width direction of the restriction plate 126 (i.e., the longitudinal direction in the vehicle 12). Therefore, the first restriction pins 124 may be respectively put into the restriction plates 126 via the opening of the cutout portion 128.

Furthermore, when the first restriction pins 124 have been put into the cutout portions 128, the first restriction pins 124 is restricted from moving back and forth (i.e., moving in the longitudinal direction of the vehicle 12) because the inner walls of the cutout portions 128 is directly in contact with the first restriction pins 124. A rear end of the right one of the first side pipes 100 is provided with a restriction piece 130. Corresponding to the restriction piece 130, a restriction portion 132 is provided on the center seat 90. The restriction portion 132 is provided with a pedestal 134. A second restriction pin 136 is protruded upward from the pedestal 134.

For example, the configurations or dimensions of the pedestal 134 and the second restriction pin 136 are set such that the second restriction pin 136 penetrates through the restriction piece 130, and thereby the restriction piece 130 is supported by the pedestal 134 when each of the first restriction pins 124 has been put into the cutout portion 128, and is supported by each of the restriction plate 126 while being directly in contact with the lower portion of the cutout portion 128. Thus, the second restriction pin 136 restricts the restriction piece 130 from moving back and forth or left and right (i.e., the longitudinal or width directions of the vehicle 12) because the second restriction pin 136 penetrates through the restriction piece 130. Also, the left one of the first side pipes 100 is provided with a striker pin 138. The striker pin 138 is protruded leftward (i.e., toward the left-side seat 20) with respect to the rear end of left one of the first side pipe 100.

Corresponding to the striker pin 138, a first latch 140 for the seating cushion side is provided on the link bracket 68. The first latch 140 may be regarded as "linking means" in the invention. The first latch 140 is provided so that the striker pin 138 may engage with the first latch 140 from above. When the striker pin 138 engages with the first latch 140 from above, a latch piece of the first latch 140 moves in coordination with the engagement so as to restrict from the striker pin 138 from falling apart from the first latch 140.

Besides, a release lever (not shown) is linked with the first latch 140. When the release lever is operated during a restricted state of the striker pin 138 caused by the latch piece, the latch piece moves so that the movement restriction of the striker pin 138 caused by the latch piece is released. The cushion base 106 of the seatback 94 is placed on the retention plate 64, during a state in which the restriction piece 130 is supported by the second restriction pin 136 of the restriction portion 132, and in which the first restriction pin 124 is supported by the restriction plate 126, and in which the striker pin 138 is retained by the first latch 140.

On the other hand, the left end of the upper frame 116 forming the seatback 94 is provided with a bracket 142. The bracket 142 includes a pair of walls 144 that face each other in the thickness direction of the seatback 94. A shaft is disposed between the two walls 144. This shaft is provided with a striker 146 having the figure "C", which is opened toward the bracket 142. The striker 146 may be regarded as "linked portion" in the invention. Incidentally, the striker 146 may pivot with respect to an axis provided along the facing direction of the walls 144. When the striker 146 pivots in one direction about the axis, the striker 146 is contained within a recess portion (not shown) provided in the pad portion that forms the seatback 94, and thereby the striker 146 is buried in the pad portion.

Corresponding to the striker 146, a second latch 148 is provided near the upper end of the right one of the side frames 46 of the left-side seat 20. Similar to the foregoing first latch 140, the second latch 148 may be regarded as "linking means" in the invention. The second latch 148 allows the striker 146 to engage therewith from front during the foregoing "normal use state". When the striker 146 engages with the second latch 148 from front, the latch piece of the second latch 148 moves in coordination with the engagement so as to restrict the striker 146 from falling apart from the second latch 148.

As described above, the second side pipe 112 is urged with respect to the bracket 108 in a pivoting direction of the seatback frame 110 from the "normal use state" to the foregoing "folded state", by urging means that is provided on at least one of the left and right brackets 108 and the left and right link pieces 122. However, during the state in which the striker 146 is retained by the second latch 148, the pivoting of the second side pipe 112 due to the urging means is restricted. Therefore, the seatback 94 is retained in the "normal use state".

Figure 3:
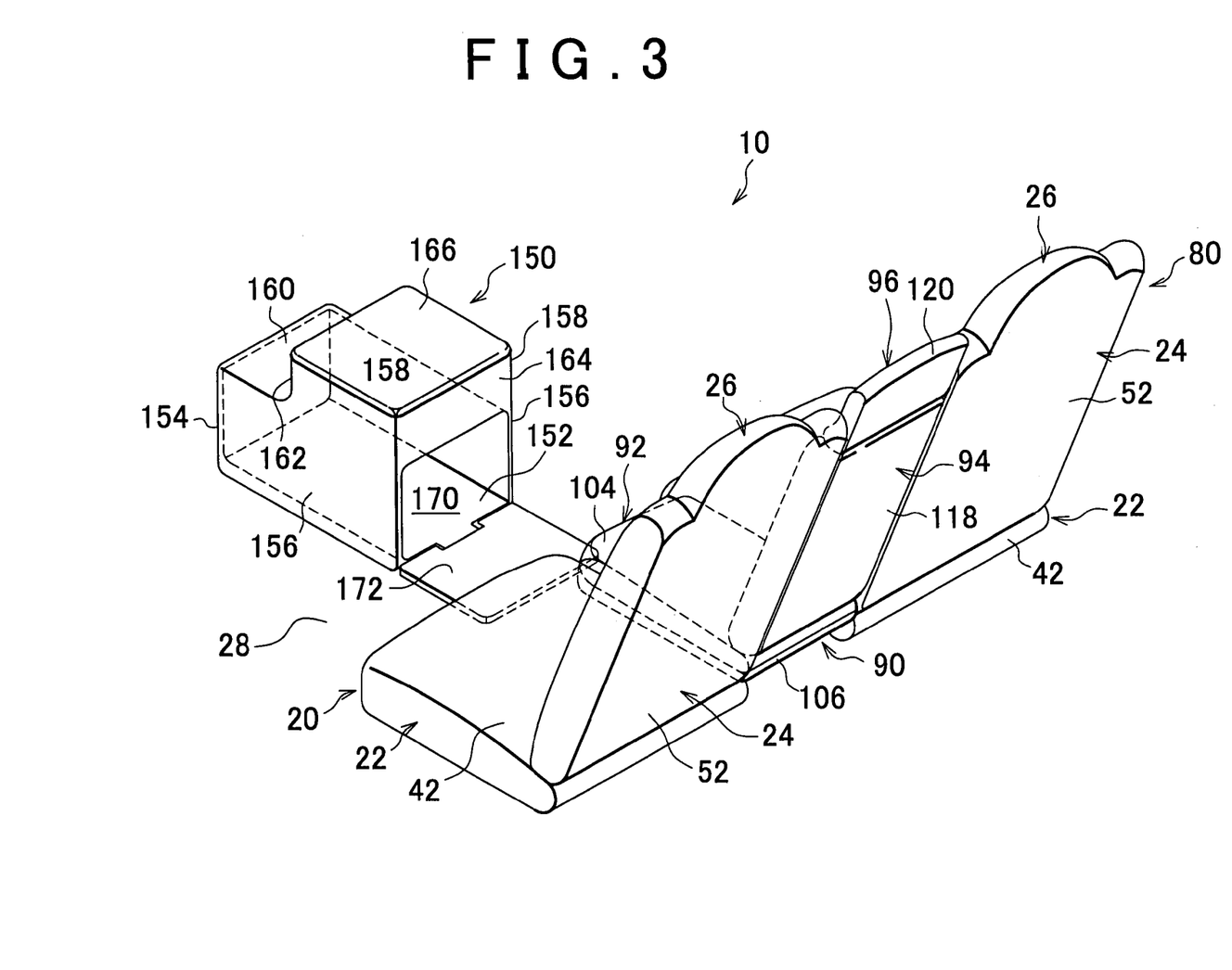
FIG. 3 is a perspective view showing a housing portion in which a lid is open corresponding to FIG. 2.
Figure 6:
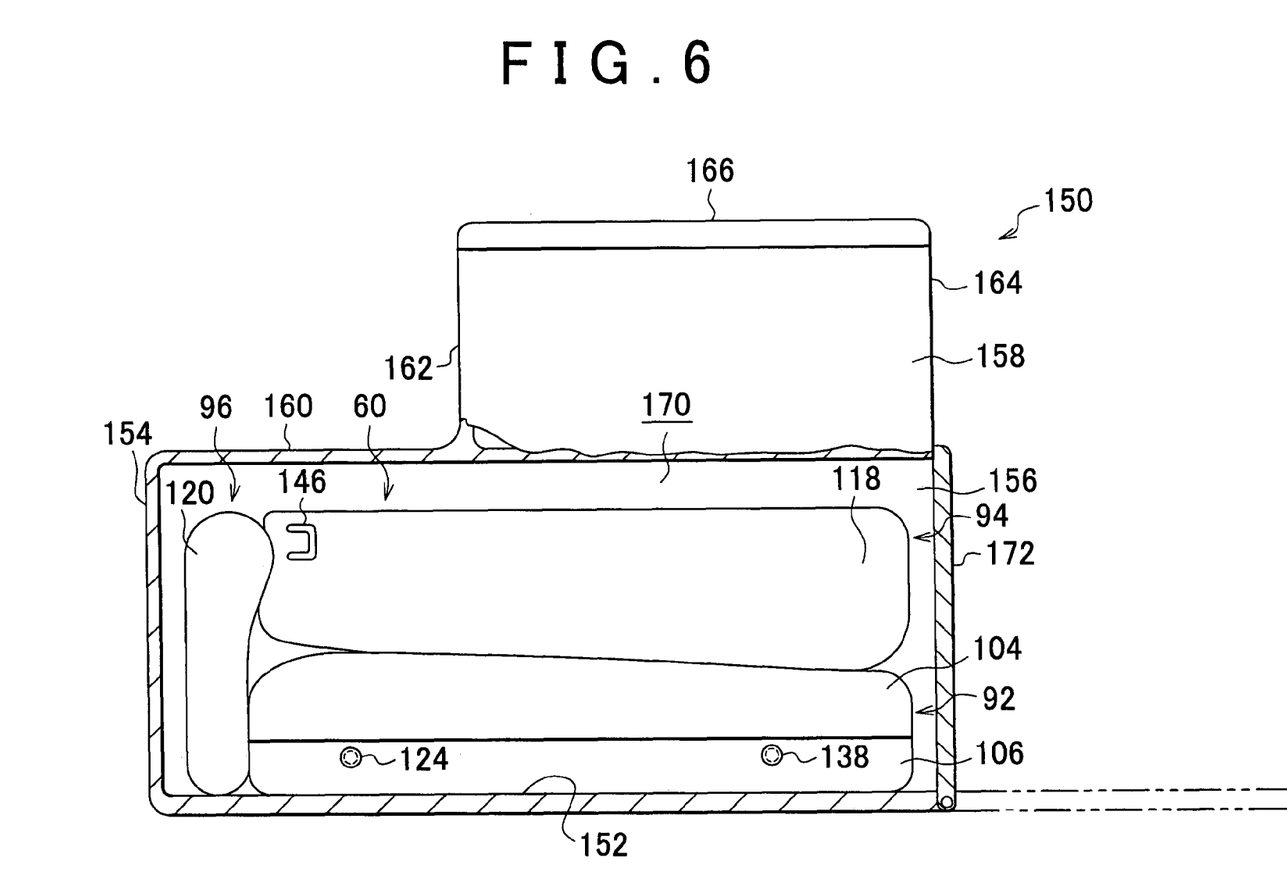
FIG. 6 is a side sectional view showing a folded seat body within a housing portion.

A console box 150 is provided on the floor 28 of the vehicle 12. The console box 150 is disposed forward in the center seat 90 and between the driver seat 14 and the navigator seat 16. The console box 150 may be regarded as "housing portion" of the invention. As shown in FIG. 3 and FIG. 6, the console box 150 includes a lower wall 152 of a rectangular shape in a plan view. A front wall 154 is raised from the front end of the lower wall 152 in the longitudinal direction of the vehicle 12, and sidewalls 156 are raised from the left and right ends of the lower wall 152 in the width direction of the vehicle 12. Extended walls 158 having a rectangular shape in a side view are formed extending upward in the rear side of each of the sidewalls 156 in the longitudinal direction. The sidewalls 156 are formed into the figure of "L" in a side view, which has a stepped shape further extending the rear side of the sidewalls 156 upward than the front side of the sidewalls 156.

An intermediate wall 160 is provided corresponding to an upper end of the front side of the sidewall 156 and corresponding to an upper end of the front wall 154. As shown in FIG. 6, the intermediate wall 160 extends below the extended wall 158, and reaches the rear end of the sidewalls 156. That is, the console box 150 has an opening backwards. Besides, another front wall 162 is formed in the front end of the extended wall 158, and a rear wall 164 is formed in the rear end of the extended wall 158. The console box 150 has another opening upwards in the extended wall 158.

A space surrounded by the extended wall 158, the front wall 162 and the rear wall 164 is provided as, for example, a glove box. This space may be opened or closed by a lid 166, which the lid may pivot with respect to an axis of a hinge provided along the upper end of the rear wall 164.

On the other hand, another space surrounded by the lower wall 152, the front wall 154, the sidewalls 156 and the intermediate wall 160 forms a center seat-housing portion 170. The center seat-housing portion 170 is designed so that the center seat 90 may be housed therein by putting the folded center seat 90 into the center seat-housing portion 170 through the rear end opening of the center seat-housing portion 170.

Besides, corresponding to the rear end opening of the center seat-housing portion 170, another lid 172 is provided on the console box 150. The lid 172 is fitted to the lower wall 152 so as to pivot with respect to an axis provided along the width direction of the vehicle 12 via a hinge. The hinge is provided along the rear end of the lower wall 152. By pivoting the lid 172, the rear end opening of the center seat-housing portion 170 may be opened or closed.

Operation and effects according to the embodiment will be described.

Figure 8:
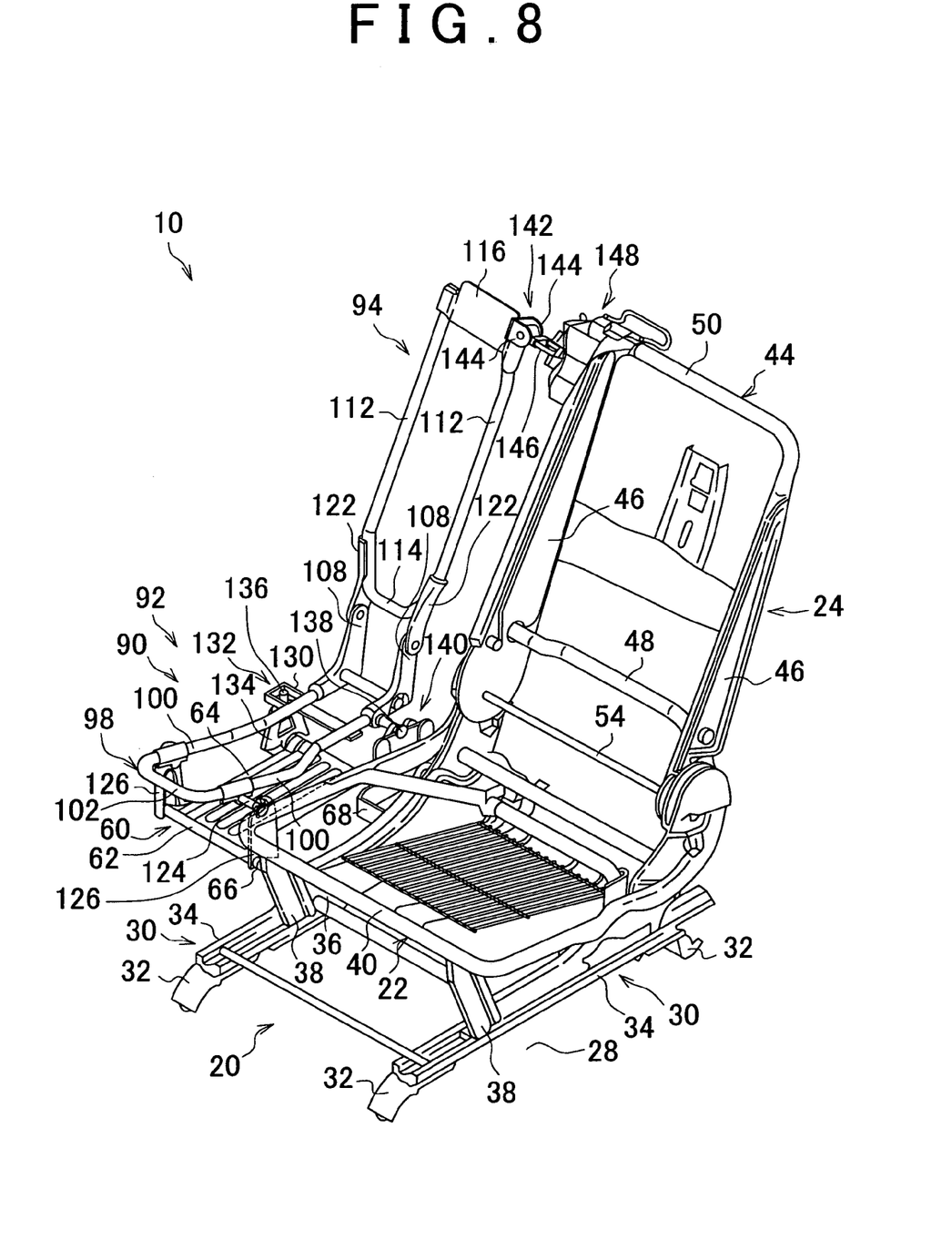
FIG. 8 is a perspective view showing the center seat and the side seat linked each other corresponding to FIG. 7.

As shown in FIG. 2, when the left-side seat 20 is normally being used, the center seat 90 is disposed on the center seat retention base 60. That is, the center seat 90 is located between the left-side seat 20 and the right-side seat 80, and thereby a so-called bench seat may be formed along the width direction of the vehicle 12. As for the center seat 90, as shown in FIG. 8, the first restriction pins 124 is respectively put into the cutout portions 128 of the restriction plates 126, and the restriction piece 130 is penetrated by the second restriction pin 136 of the restriction portion 132.

Therefore, the center seat 90 under the "normal use state" is restricted from moving back and forth, left and right, or up and down with respect to the left-side seat 20 of the vehicle 12. Furthermore, in this state, the striker pin 138 is engaged with the first latch 140, and the striker 146 is engaged with the second latch 148. Therefore, the center seat 90 is mechanically interlocked with the left-side seat 20. In this state, when the left-side seat 20 slides forward or backward while being guided by the rail bodies 34, the center seat 90 also slides forward or backward due to the interlocking with the left-side seat 20. Besides, when the seatback 24 pivots with respect to the connecting shaft 54, the seatback 94 also pivots accordingly.

Figure 4:
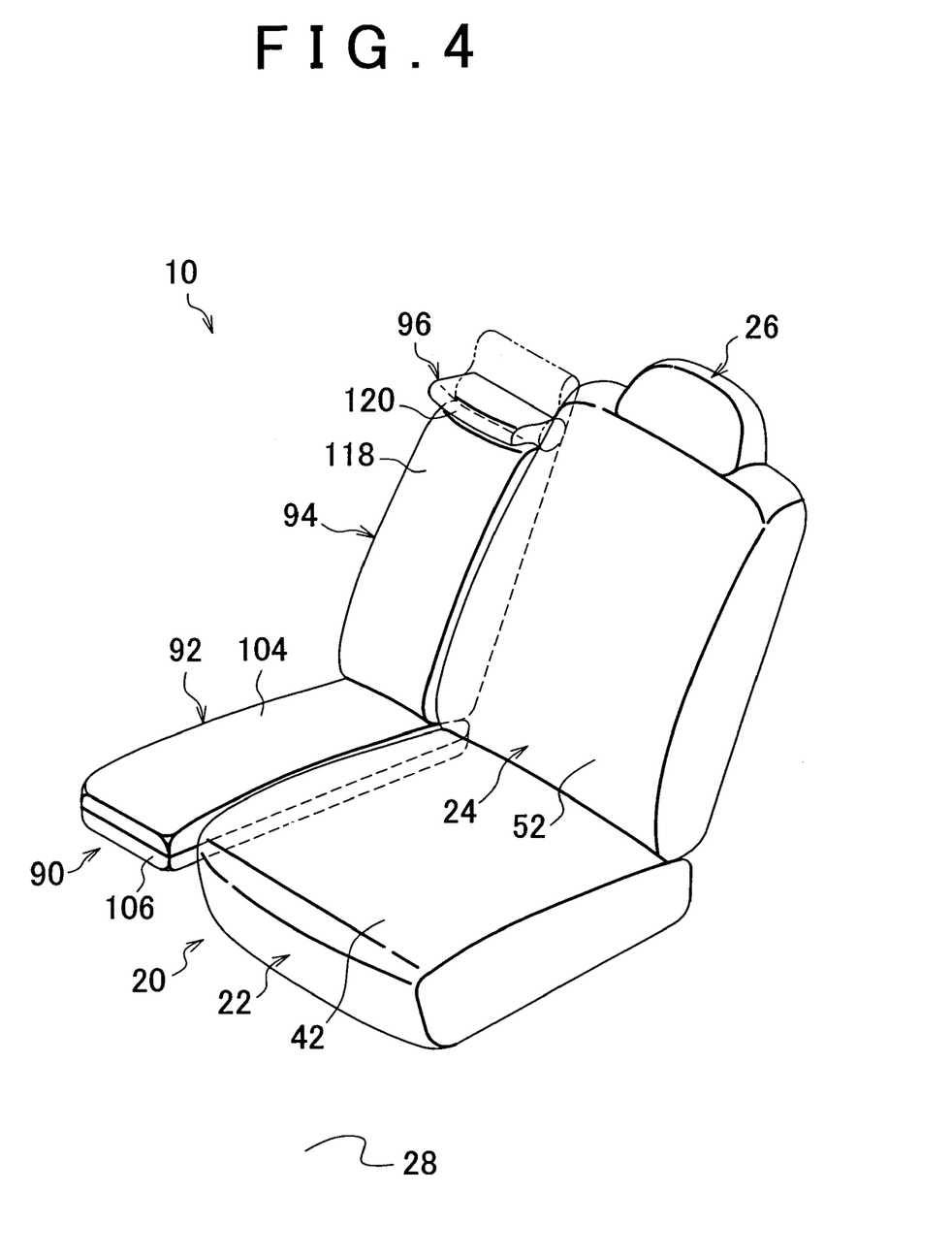
FIG. 4 is a perspective front view of a passenger seat in accordance with an embodiment of the invention, showing a folded headrest of a seat body.
Figure 9:
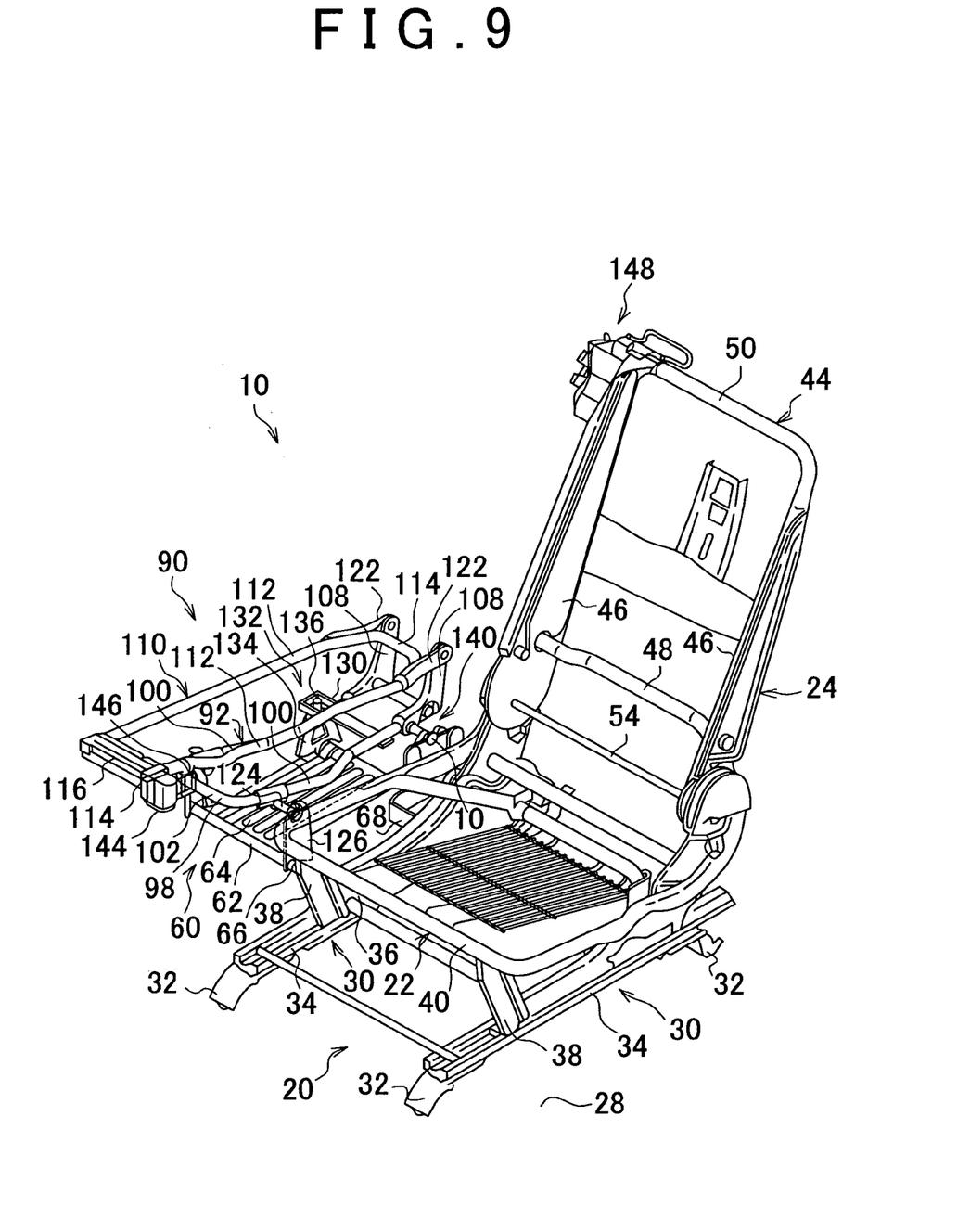
FIG. 9 is a perspective view showing a folded seatback of the center seat corresponding to FIG. 7.

Hereinafter, an operation of detaching the center seat 90 will be described. Firstly, the headrest 96 is tilted down forward as shown in FIG. 4 from the foregoing "normal use state". Next, when the restricted state of the striker 146 due to the second latch 148 is released, the seatback 94 is tilted down forward. Therefore, the striker 146 moves out of the second latch 148 as shown in FIG. 9, and the seatback 94 is folded as shown in FIG. 5. As a result, the thickness direction of the seatback 94 coincides with the thickness direction of the seating cushion 92. From this state, when the restricted state of the striker pin 138 due to the first latch 140 is released, the second restriction pin 136 is moved out of the restriction piece 130, and the first restriction pins 124 are moved out of the cutout portions 128.

In this state, the center seat 90 may be detached out of the left-side seat 20. Before or after the operation of detaching the center seat 90, the closed lid 172 as shown in FIG. 3 is caused to pivot, and then the rear end opening of the center seat-housing portion 170 is opened. From this state, the folded center seat 90 that has detached from the left-side seat 20 is placed on the floor 28 so that the folded center seat 90 and the center seat-housing portion 170 face each other in the longitudinal direction of the vehicle 12. Next, the center seat 90 is pushed into the center seat-housing portion 170, so that the center seat 90 is housed into the center seat-housing portion 170 as shown in FIG. 6.

The above-described operation of detaching the center seat 90 is finally completed by bringing the first restriction pins 124 out of the cutout portions 128. Since each of the cutout portions 128 is open at the front edge of the restriction plates 126, each of the first restriction pins 124 moves forward in the vehicle 12 when the first restriction pins 124 is brought out of the cutout portions 128. That is, the moving direction of the first restriction pin 124 is the same as a moving direction of the center seat 90 on the floor 28 when the center seat 90 is housed into the center seat-housing portion 170 after the operation of detaching the center seat 90 has completed. Therefore, the workability of housing the center seat 90 may be improved.

Before housing the center seat 90 into the center seat-housing portion 170 of the console box 150, the closed lid 172 is caused to pivot, as described above, and thereby the rear end opening of the center seat-housing portion 170 is opened. Since the lid 172 may pivot due to the hinge provided along the rear end of the lower wall 152, the opened lid 172 is in contact with the floor 28 when the rear end opening of the center seat-housing portion 170 has been opened. Then, the center seat 90 is placed on the opened lid 172, and is pushed into the center seat-housing portion 170. Thus, since the opened lid 172 extends from the lower wall 152 while functioning as a placement portion of the center seat 90, the workability of housing the center seat 90 may be further improved.

Thus, in this embodiment, the folded center seat 90 that has been detached from the left-side seat 20 is pushed forward in the vehicle 12 on the floor 28, and then is housed into the center seat-housing portion 170. When taking the folded center seat 90 out of the center seat-housing portion 170, the folded center seat 90 is pulled backward in the vehicle 12. Thus, since the center seat 90 moves on the floor 28 when housing into or taken out of the center seat-housing portion 170, the weight of the center seat 90 is mainly supported by the floor 28. Therefore, an operator may not be required to carry much of the weight of the center seat 90, and the operations of housing and taking out the center seat 90 may be simple.

In this embodiment, the center seat 90 in the "normal use state" is provided on the center seat retention base 60 while the center seat retention base is spaced upward from the floor 28. Thus, the center seat 90 in the "normal use state" is not placed on the floor surface in the vehicle 12, but is being retained apart upward from the floor surface (i.e., spaced upward from the floor surface). Therefore, when the center seat 90 is arranged rightward in the left-side seat 20, the seating cushion 92 according to the embodiment may be made thinner as compared to a seating cushion being directly placed on the floor surface. Besides, even in comparison with another seating cushion 92 being provided with leg portions and directly placed above the floor surface, the seating cushion 92 according to the embodiment may reduce the overall dimensions in the thickness direction of the seating cushion 92 by an amount corresponding to the omission of such leg portions.

The seat back 94 is folded over to the seating cushion 92 so that the thickness direction of the seatback 94 is caused to coincide with the thickness direction of the seating cushion 92 in the folded state of the center seat 9. Thus, the thickness of the folded center seat 9 may also be reduced if the thickness of the seating cushion 92 is lessened. Accordingly, the center seat 90 may be reduced in size, and the operations of housing and taking out the center seat 90 may be made further simple.

Furthermore, since the center seat 90 may be reduced in size (especially in thickness), and weight, the console box 150 housing the folded center seat 90 may also be reduced in size, and thereby the driver seat 14 or the navigator seat 16 may be correspondingly made larger. Thus, the spaces in the cabin of the vehicle 12 may be effectively utilized. Alternatively, a recess portion having an upward opening is formed on the floor 28, and the folded center seat 90 according to the embodiment may be housed into the recess portion. Even in this manner, the center seat 90 may also be made thinner as compared to the related art, and thereby the seatback 94 of the folded center seat 90 may not protrude from the recess portion when housing the center seat 90 without detaching the pad portion from the seating cushion 92. In addition, the workability of housing and taking-out the center seat 90 may be improved, and the interior appearance of the cabin of the vehicle 12 may also be good-looking when the center seat 90 has been housed.

According to the embodiment of the invention, the first latch 140 and the second latch 148 for linking the center seat 90 with the left-side seat 20 are provided in the left-side seat 20. On the other hand, the striker pin 138 and the striker 146 that respectively engage with the first latch 140 and the second latch 148 are provided in the center seat 90. Therefore, in comparison with a case that the first latch 140 and the second latch 148 are provided in the center seat 90, the center seat 90 may further reduce the weight. Moreover, the operations of housing and taking out the center seat 90 may be further simple.

Furthermore, as described above, since the striker 146 is caused to pivot and is buried into the pad portion of the seatback 94, protruded sites outward the seatback 94 (therefore, outward the center seat 90) in the width direction may be lessened when the center seat 90 is housed into the center seat-housing portion 170. Therefore, the folded center seat 90 to be housed may be made more compact.

According to the embodiment of the invention, the center seat-housing portion 170 has the rear end opening that is opened backward in the vehicle 12. Therefore, extraneous matters that fall from above such as litter, dust, and dirt do not enter mostly the center seat-housing portion 170 through the rear end opening. Furthermore, except during the operations of housing and taking out the center seat 90, the rear end opening of the center seat-housing portion 170 is being closed by the lid 172. Thus, the entry of extraneous matters into the center seat-housing portion 170 may be effectively prevented or restrained.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A housing system for a passenger seat that is housed in a vehicle cabin, comprising:
 a seat body including
  a seating cushion, and
  a seatback, the seatback being foldable with respect to the seating cushion so that a thickness direction of the seatback coincides with a thickness direction of the seating cushion;
 a housing portion having a box shape that opens toward the seat body, the seat body being capable of being housed in the housing portion when the seatback is folded, the housing portion being disposed with respect to the seat body in a horizontal direction, and
 a lid attached to the housing portion, which opens or closes an opening of the housing portion, such that in an open position, the lid allows the seat body to be placed thereon.

2. The housing system according to claim 1, further comprising:
 a main seat disposed laterally to the seat body; and
 a linking portion attached to the main seat that detachably links the seat body with the main seat.

3. The housing system according to claim 2, wherein the seat body includes a linked portion that links with the linking portion of the main seat, the linked portion being pivotable into the seat body.

4. The housing system according to claim 2, wherein the main seat includes a seat retention portion that retains the seat body so that the seat body is spaced a distance above the floor of the vehicle cabin.

5. The housing system according to claim 4, wherein the seat body is a center seat of a back-row seat disposed in the vehicle cabin, and
 wherein the seat retention portion includes a center seat retention base that retains the center seat spaced a distance above the floor of the vehicle cabin.

6. The housing system according to claim 5, wherein the center seat retention base includes a retention frame and a retention plate that is fixed to the retention frame.

7. The housing system according to claim 6, wherein the retention frame includes a linking rod that is linked with a leg portion provided in the main seat, and a linking bracket that is linked with a sliding member provided in the main seat.

8. The housing system according to claim 1, wherein the housing portion accommodates the seat body therein such that the seating cushion and the seatback are substantially parallel with a floor of the vehicle cabin.

9. A housing system for a passenger seat that is housed in a vehicle cabin, comprising:
　a seat body including
　　a seating cushion, and
　　a seatback, the seatback being foldable with respect to the seating cushion so that a thickness direction of the seatback coincides with a thickness direction of the seating cushion;
　a housing portion having a box shape that opens toward the seat body, the seat body being capable of being housed in the housing portion when the seatback is folded, the housing portion disposed on a floor of the vehicle cabin, and
　a lid attached to the housing portion, which opens or closes an opening of the housing portion, such that in an open position, the lid allows the seat body to be placed thereon.

10. The housing system according to claim 9, further comprising:
　a main seat disposed laterally to the seat body; and
　a linking portion attached to the main seat that detachably links the seat body with the main seat.

11. The housing system according to claim 10, wherein the seat body includes a linked portion that links with the linking portion of the main seat, the linked portion being pivotable into the seat body.

12. The housing system according to claim 10, wherein the main seat includes a seat retention portion that retains the seat body so that the seat body is spaced a distance above the floor of the vehicle cabin.

13. The housing system according to claim 12, wherein the seat body is a center seat of a back-row seat disposed in the vehicle cabin, and
　wherein the seat retention portion includes a center seat retention base that retains the center seat spaced a distance above the floor of the vehicle cabin.

14. The housing system according to claim 13, wherein the center seat retention base includes a retention frame and a retention plate that is fixed to the retention frame.

15. The housing system according to claim 14, wherein the retention frame includes a linking rod that is linked with a leg portion provided in the main seat, and a linking bracket that is linked with a sliding member provided in the main seat.

16. The housing system according to claim 9, wherein the housing portion accommodates the seat body therein such that the seating cushion and the seatback are substantially parallel with a floor of the vehicle cabin.

17. A housing method for housing a passenger seat in a vehicle cabin, comprising:
　folding a seatback of a seat body with respect to a seating cushion of the seat body so that a thickness direction of the seatback coincides with a thickness direction of the seating cushion; and
　housing the seat body with the seatback being folded into a housing portion that is disposed facing the seat body in a horizontal direction, the housing portion having a box shape that opens toward the seat body and including a lid attached thereto, the lid opening or closing an opening of the housing portion, such that in an open position, the lid allows the seat body to be placed thereon.

18. A housing method for housing a passenger seat in a vehicle cabin, comprising:
　folding a seatback of a seat body with respect to a seating cushion of the seat body so that a thickness direction of the seatback coincides with a thickness direction of the seating cushion; and
　housing the seat body with the seatback being folded into a housing portion that is provided on a floor of the vehicle cabin, the housing portion having a box shape that opens toward the seat body and including a lid attached thereto, the lid opening or closing an opening of the housing portion, such that in an open position, the lid allows the seat body to be placed thereon.

* * * * *